US010767026B2

(12) United States Patent
Desrousseaux et al.

(10) Patent No.: US 10,767,026 B2
(45) Date of Patent: Sep. 8, 2020

(54) PROCESS FOR DEGRADING PLASTIC PRODUCTS

(71) Applicant: CARBIOS, Saint-Beauzire (FR)

(72) Inventors: Marie-Laure Desrousseaux, Lompret (FR); Helene Texier, Eaunes (FR); Sophie Duquesne, Toulouse (FR); Alain Marty, Toulouse (FR); Mediha Aloui Dalibey, Clermont-Ferrand (FR); Michel Chateau, Riom (FR)

(73) Assignee: CARBIOS, Saint-Beauzire (FR)

( * ) Notice: Subject to any disclaimer, the term of this patent is extended or adjusted under 35 U.S.C. 154(b) by 30 days.

(21) Appl. No.: 16/302,107

(22) PCT Filed: May 18, 2017

(86) PCT No.: PCT/EP2017/062028
§ 371 (c)(1),
(2) Date: Nov. 16, 2018

(87) PCT Pub. No.: WO2017/198786
PCT Pub. Date: Nov. 23, 2017

(65) Prior Publication Data
US 2019/0218360 A1    Jul. 18, 2019

(30) Foreign Application Priority Data
May 19, 2016 (EP) .................................... 16305578

(51) Int. Cl.
*C08J 11/14* (2006.01)
*C08J 11/10* (2006.01)

(52) U.S. Cl.
CPC .............. *C08J 11/105* (2013.01); *C08J 11/14* (2013.01); *C08J 2367/02* (2013.01); *C08J 2367/04* (2013.01); *Y02W 30/702* (2015.05)

(58) Field of Classification Search
USPC .......................................................... 521/48
See application file for complete search history.

(56) References Cited

U.S. PATENT DOCUMENTS

| 5,032,512 | A  | 7/1991  | Witholt et al.  |
| 5,145,779 | A  | 9/1992  | Pometto et al.  |
| 5,212,219 | A  | 5/1993  | Griffin         |
| 5,316,847 | A  | 5/1994  | Suominen        |
| 5,378,738 | A  | 1/1995  | Deguchi et al.  |
| 5,426,047 | A  | 6/1995  | Ito et al.      |
| 6,312,578 | B1 | 11/2001 | Canivenc et al. |
| 6,429,006 | B1 | 8/2002  | Porro et al.    |
| 7,465,575 | B2 | 12/2008 | Nilsson         |
| 7,534,597 | B2 | 5/2009  | Hause et al.    |
| 7,960,154 | B1 | 6/2011  | Nakajima et al. |
| 8,137,953 | B2 | 3/2012  | Miller et al.   |
| 8,476,056 | B2 | 7/2013  | Hoang et al.    |
| 8,614,076 | B2 | 12/2013 | Wada et al.     |
| 8,859,260 | B2 | 10/2014 | Sawai et al.    |
| 9,476,073 | B2 | 10/2016 | Boisart         |
| 9,528,132 | B2 | 12/2016 | Mazzoli et al.  |
| 10,124,512 | B2 | 11/2018 | Boisart et al.  |
| 2005/0261465 | A1 | 11/2005 | Nagarajan    |
| 2006/0106120 | A1 | 5/2006  | Abe et al.   |
| 2011/0008855 | A1 | 1/2011  | Park et al.  |
| 2011/0200771 | A1 | 8/2011  | Barclay      |
| 2011/0245057 | A1 | 10/2011 | Scoledes et al. |
| 2011/0319588 | A1 | 12/2011 | Coupin et al. |
| 2012/0184005 | A1 | 7/2012  | Ferreira et al. |
| 2013/0274373 | A1 | 10/2013 | Yoshikawa et al. |
| 2014/0303278 | A1 | 10/2014 | Ferreira et al. |
| 2015/0056673 | A1 | 2/2015  | Boisart      |
| 2015/0290840 | A1 | 10/2015 | Boisart et al. |
| 2016/0280881 | A1 | 9/2016  | Boisart et al. |
| 2017/0114205 | A1 | 4/2017  | Maille       |
| 2017/0313998 | A1 | 11/2017 | Alvarez et al. |
| 2017/0349723 | A1 | 12/2017 | Ferreira et al. |
| 2018/0051264 | A1 | 2/2018  | Li et al.    |
| 2018/0142097 | A1 | 5/2018  | Guemard et al. |
| 2018/0186943 | A1 | 7/2018  | Chateau et al. |

FOREIGN PATENT DOCUMENTS

| CN | 101 457 218 | 6/2009 |
| CN | 102675712   | 9/2012 |
| CN | 103980535   | 8/2014 |
| EP | 0 421 413   | 4/1991 |

(Continued)

OTHER PUBLICATIONS

Currently pending claims of U.S. Appl. No. 16/064,494, 2018, pp. 1-3.
Written Opinion in International Application No. PCT/EP2017/062028, dated Jun. 30, 2017, pp. 1-5.
Matsuda, E. et al. "Gene Cloning and Molecular Characterization of an Extracellular Poly($_L$-Lactic Acid) Depolymerase from *Amycolatopsis* sp. Strain K104-1" *Journal of Bacteriology*, Nov. 2005, pp. 7333-7340, vol. 187, No. 21.
Database WPI, Accession No. 2009-K99963, Jun. 17, 2009, pp. 1-2, XP-002690934.
Database WPI, Accession No. 2008-F66138, Dec. 13, 2007, pp. 1-2, XP-002690935.
Wang, Z.-Y. et al. "Gene Cloning and Characterization of a Poly($_{DL}$-Lactic Acid) Depolymerase from *Pseudomonas* sp. Strain DS04-T" *J Polym Environ*, Aug. 28, 2011, pp. 827-833, vol. 19, No. 4.

(Continued)

*Primary Examiner* — Terressa Boykin
(74) *Attorney, Agent, or Firm* — Saliwanchik, Lloyd & Eisenschenk

(57) ABSTRACT

The present invention relates to processes for degrading plastic products and the uses thereof. The processes of the invention particularly comprise a step of amorphizing a plastic product prior to a step of depolymerization. The processes of the invention are particularly useful for degrading a plastic product comprising polyethylene terephthalate and/or polylactic acid. The invention also relates to a method of producing monomers and/or oligomers from a plastic product comprising at least one polyester, particularly polyethylene terephthalate and/or polylactic acid, comprising submitting the plastic product both to an amorphization step and to a depolymerization step.

21 Claims, 2 Drawing Sheets

(56) References Cited

FOREIGN PATENT DOCUMENTS

Figure 1:
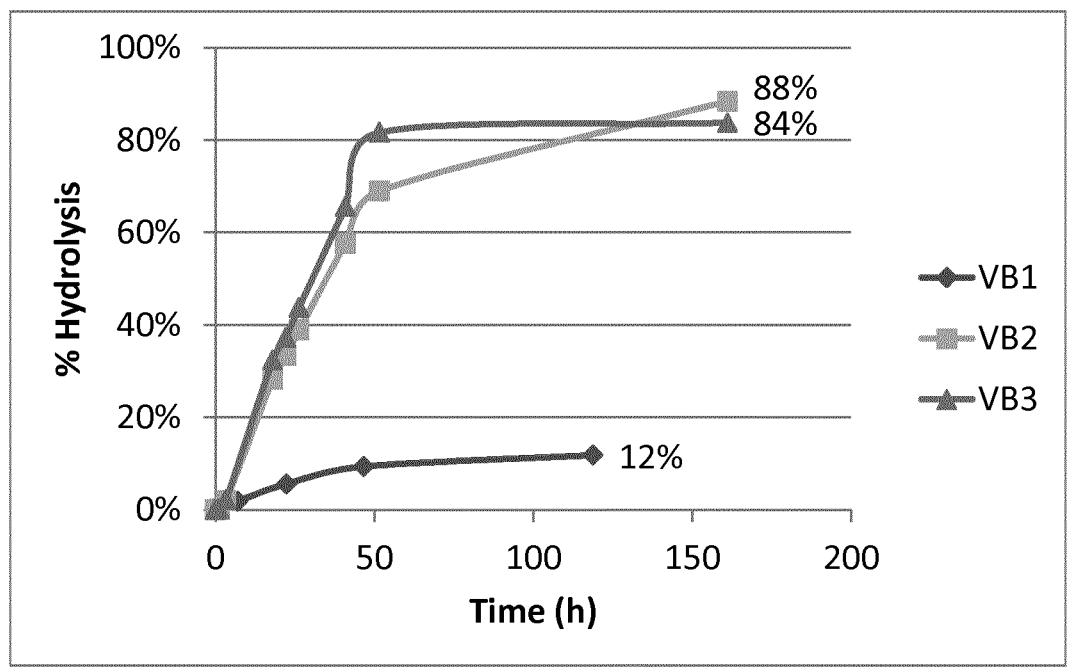

| | | |
|---|---|---|
| EP | 0 738 752 | 10/1996 |
| EP | 1 548 053 | 6/2005 |
| EP | 2 013 280 | 1/2009 |
| EP | 2 348 122 | 7/2011 |
| EP | 2 377 945 | 10/2011 |
| EP | 2 471 910 | 7/2012 |
| EP | 2 626 386 | 8/2013 |
| JP | 2000-506442 | 5/2000 |
| JP | 2002-293982 | 10/2002 |
| JP | 2002-320499 | 11/2002 |
| JP | 2002 362578 | 12/2002 |
| JP | 2003-079388 | 3/2003 |
| JP | 2003-128835 | 5/2003 |
| JP | 2004 058010 | 2/2004 |
| JP | 2004-290130 | 10/2004 |
| JP | 2004 292705 | 10/2004 |
| JP | 2007 319092 | 12/2007 |
| JP | 2012 149273 | 8/2012 |
| JP | 2012-152171 | 8/2012 |
| JP | 2013 000099 | 1/2013 |
| JP | 5 630597 | 11/2014 |
| KR | 20110045975 | 5/2011 |
| WO | WO 89/10381 | 11/1989 |
| WO | WO 2005/026245 | 3/2005 |
| WO | WO 2010/012805 | 2/2010 |
| WO | WO 2010/081887 | 7/2010 |
| WO | WO 2011/039489 | 4/2011 |
| WO | WO 2013/144239 | 10/2013 |
| WO | WO 2014/079844 | 5/2014 |
| WO | WO 2014/122698 | 8/2014 |
| WO | WO 2014/167518 | 10/2014 |
| WO | WO 2014/167562 | 10/2014 |
| WO | WO 2015/067619 | 5/2015 |
| WO | WO 2015/097104 | 7/2015 |
| WO | WO 2015/173265 | 11/2015 |
| WO | WO 2016/198650 | 12/2016 |
| WO | WO 2016/198652 | 12/2016 |
| WO | WO 2017/108577 | 6/2017 |

OTHER PUBLICATIONS

Akutsu-Shigeno, Y. et al. "Cloning and Sequencing of a Poly($_{DL}$-Lactic Acid) Depolymerase Gene from *Paenibacillus amylolyticus* Strain TB-13 and Its Functional Expression in *Escherichia coli*" Applied and Environmental Microbiology, May 2003, pp. 2498-2504, vol. 69, No. 5.
Petrov, K. et al. "$_L$(+)-Lactic acid production from starch by a novel amylolytic *Lactococcus lactis* subsp. *lactis* 884" Food Microbiology, Jun. 2008, pp. 550-557, vol. 25.
Currently pending claims of U.S. Appl. No. 14/443,524, 2016, pp. 1-4.
Bernard, N. et al. "Cloning of the D-lactate dehydrogenase gene from *Lactobacillus delbrueckii* subsp. *bulgaricus* by complementation in *Escherichia coli*" FEBS, Sep. 1991, pp. 61-64, No. 1.
Wieczorek, A. et al. "Engineering the cell surface display of cohesins for assembly of cellulosome-inspired enzyme complexes on *Lactococcus lactis*" Microbial Cell Factories, Sep. 2010, pp. 1-13, Vo. 9, No. 69.
Wieczorek, A. et al. "Effects of synthetic cohesin-containing scaffold protein architecture on binding dockerin-enzyme fusions on the surface of *Lactococcus lactis*" Microbial Cell Factories, 2012, pp. 1-13, vol. 160, No. 11.
Koukiekolo, R. et al. "Degradation of Corn Fiber by *Clostridium cellulovorans* Cellulases and Hemicellulases and Contribution of Scaffolding Protein CbpA" Applied and Environmental Microbiology, Jul. 1, 2005, pp. 3504-3511, vol. 71, No. 7.
Cha, J. et al. "Effect of Multiple Copies of Cohesins on Cellulase and Hemicellulase Activities of *Clostridium cellulovorans* Minicellulosomes" Journal of Microbiology and Biotechnology, 2007, pp. 1782-1788, vol. 17, No. 11.

Kataeva, I. et al. "Interaction between *Clostridium thermocellum* endoglucanase CelD and polypeptides derived from the cellulosome-integrating protein CipA: stoichiometry and cellulolytic activity of the complexes" Biochemical Journal, 1997, pp. 617-624, vol. 326, No. 2.
Wen, F. et al. "Yeast Surface Display of Tritunctional Minicellulosomes for Simultaneous Saccharification and Fermentation of Cellulose to Ethanol" Applied and Environmental Microbiology, Feb. 1, 2010, pp. 1251-1260, vol. 76, No. 4.
Hyeon, J. E. et al. "Production of minicellulosomes for the enhanced hydrolysis of cellulosic substrates by recombinant *Corynebacterium glutamicum*" Enzyme and Microbial Technology, 2011, pp. 371-377, vol. 48.
Sun, J. et al. "Direct Conversion of Xylan to Ethanol by Recombinant *Saccharomyces cerevisiae* Strains Displaying an Engineered Minihemicellulosome" Applied and Environmental Microbiology, Jun. 2012, pp. 3837-3845, vol. 78, No. 11.
Database EMBL [Online] Accession No. HC441374. "Sequence 9 from Patent WO2010012805" Feb. 20, 2010, pp. 1-3, XP-002697306.
Database Geneseq [Online] Accession No. AZM34659, "*Clostridium* sp. Cellulose-binding protein-A (CbpA) DNA SEQ: 6" Oct. 13, 2011, p. 1, XP-002697307.
Written Opinion in International Application No. PCT/EP2013/061413, dated Aug. 5, 2013, pp. 1-7.
Devos, D. et al. "Practical Limits of Function Prediction" Proteins: Structure, Function and Genetics, 2000, pp. 98-107, vol. 41.
Whisstock, J. C. et al. "Prediction of protein function from protein sequence and structure" Quarterly Reviews of Biophysics, 2003, pp. 307-340, vol. 36, No. 3.
Witkowski, A. et al. "Conversion of a β-Ketoacyl Synthase to a Malonyl Decarboxylase by Replacement of the Active-Site Cysteine with Glutamine" Biochemistry, 1999, pp. 11643-11650, vol. 38.
Kisselev, L. "Polypeptide Release Factors in Prokaryotes and Eukaryotes: Same Function, Different Structure" Structure, Jan. 2002, pp. 8-9, vol. 10.
Database WPI, Accession No. 2005-262580, Mar. 24, 2005, pp. 1-3, XP-002690554.
Database WPI, Accession No. 2004-751104, Oct. 21, 2004, pp. 1-2, XP-002690555.
Currently pending claims of U.S. Appl. No. 14/387,285, 2014, pp. 1-3.
Yoshida, S. et al. "A bacterium that degrades and assimilates poly(ethylene terephthalate)" Science, Mar. 11, 2016, pp. 1196-1199, vol. 351.
Demirel, B. et al. "Crystallization Behavior of PET Materials" BAU Fen Bil. Enst. Dergisi Cilt, 2011, pp. 26-35, vol. 13, No. 1.
Kyrikou, I. et al. "Biodegradation of Agricultural Plastic Films: A Critical review" J Polym Environ, 2007, pp. 125-150, vol. 15.
Chen, S. et al. "Identification and Characterization of Bacterial Cutinase" The Journal of Biological Chemistry, Sep. 19, 2008, pp. 25854-25862, vol. 238, No. 38.
Ronkvist, A. M. et al. "Cutinase-Catalyzed Hydrolysis of Poly(ethylene terephthalate)" Macromolecules, 2009, pp. 5128-5138, vol. 42.
Nabil, H. et al. "Recycled Polyethylene Terephthalate Filled Natural Rubber Compounds: Effects of Filler Loading and Types of Matrix" Journal of Elastomers and Plastics, 2011, pp. 1-21, vol. 00-2011.
Bartolome, L. et al. "Recent Developments in the Chemical Recycling of PET" Material Recycling—Trends and Perspectives, Mar. 16, 2012, pp. 1-21.
Arutchelvi, J. et al. "Biodegradation of polyethylene and polypropylene" Indian Journal of Biotechnology, Jan. 2008, pp. 9-22, vol. 7.
Iwamoto, A. et al. "Enzymatic degradation of plastics containing polycaprolactone" Polymer Degradation and Stability, Jan. 1, 1994, pp. 205-213, vol. 45.
Mueller, R.-J. "Biological degradation of synthetic polyesters—Enzymes as potential catalysts for polyester recycling" Process Biochemistry, 2006, pp. 2124-2128, vol. 41, No. 10.
Written Opinion in International Application No. PCT/EP2014/073742, dated Aug. 8, 2015, pp. 1-5.

(56) References Cited

OTHER PUBLICATIONS

Herrero Acero, E. et al. "Enzymatic Surface Hydrolysis of PET: Effect of Structural Diversity on Kinetic Properties of Cutinases from *Thermobifida*" *Macromolecules*, 2011, pp. 4632-4640, vol. 44, No. 12.

Herrero Acero, E. et al. "Surface Engineering of a Cutinase From *Thermobifida cellulosilytica* for Improved Polyester Hydrolysis" *Biotechnology & Bioengineering*, Oct. 2013, pp. 2581-2590, vol. 110, No. 10.

Shah, A. A. et al. "Degradation of aliphatic and aliphatic-aromatic co-polyesters by depolymerases from *Roseateles depolymerans* strain TB-87 and analysis of degradation products by LC-MS" *Polymer Degradation and Stability*, Oct. 16, 2013, pp. 2722-2729, vol. 98, No. 12.

Written Opinion in International Application No. PCT/EP2015/060521, dated Jul. 20, 2015, pp. 1-6.

Wikipedia, https://web.archive.org/web/20130424032652/https://en.wikipedia.org/wiki/Polyethylene_terephthalate, archived Apr. 24, 2013, accessed Aug. 13, 2018, pp. 1-13.

Sukkhum, S. et al. "A novel poly($_L$-lactide) degrading actinomycetes isolated from Thai forest soil, phylogenic relationship and the enzyme characterization" *The Journal of General and Applied Microbiology*, 2009, pp. 459-467, vol. 55, No. 6.

Sukkhum, S. et al. "Poly($_L$-Lactide)-Degrading Enzyme Production by *Actinomadura keratinilytica* T16-1 in 3 L Airlift Bioreactor and Its Degradation Ability for Biological Recycle" *Journal of Microbiology and Biotechnology*, Jan. 28, 2012, pp. 92-99, vol. 22, No. 1.

Written Opinion in International Application No. PCT/EP2015/074222, dated Feb. 1, 2016, pp. 1-5.

Niaounakis, 2013. Chapter 4: Disposal. Biopolymers Reuse, Recycling, and Disposal. A Volume in Plastics Design Library, a PDL Handbook Series. ISBN 978-1-4557-3145-9, published by Elsevier Inc, pp. 107-150.

Sugimori, Mar. 2013. Protease, washing agent containing the protease, and method of manufacturing the washing agent. EMBL AB809463, pp. 1-2.

Albertsson, A- C. et al. "Chemistry and biochemistry of polymer biodegradation" *Chemistry and Technology of Biodegradable Polymers*, Jan. 1, 1994, pp. 7-17, Section 2.

Database WPI [Online] Accession No. 2012-Q50933, Sep. 9, 2012, p. 1, XP-002740253.

Database WPI [Online] Accession No. 2004-046313, May 8, 2003, pp. 1-2, XP-002740254.

Written Opinion in International Application No. PCT/EP2015/080557, dated Feb. 3, 2016, pp. 1-6.

Gouda, M. K. et al. "Production of a Polyester Degrading Extracellular Hydrolase from *Thermomonospora fusca*" *Biotechnology Progress*, Sep. 2002, pp. 927-934, vol. 18, No. 5.

Oda, Y. et al. "Degradation of Polylactide by Commercial Proteases" *Journal of Polymers and the Environment*, Jan. 2000, pp. 29-32, vol. 8, No. 1.

Written Opinion in International Application No. PCT/EP2016/055348, dated Jun. 2, 2016, pp. 1-6.

Database UniProt [Online] Accession No. I0LED3, Jun. 13, 2012, pp. 1-2, XP-002743807.

Database Geneseq [Online] Accession No. BAJ28992, Jan. 31, 2013, pp. 1-10, XP-002743803.

Database Geneseq [Online] Accession No. BAJ28991, Jan. 31, 2013, pp. 1-2, XP-002743804.

Database UniProt [Online] Accession No. F4F956, Jun. 28, 2011, pp. 1-2, XP-002743805.

Database UniProt [Online] Accession No. A8LWF7, Dec. 4, 2007, p. 1-2, XP-002743806.

Written Opinion in International Application No. PCT/EP2016/063369, dated Aug. 1, 2016, pp. 1-6.

Written Opinion in International Application No. PCT/EP2016/063373, dated Aug. 8, 2017, pp. 1-7.

Okino, S. et al. "Production of D-lactic acid by *Corynebacterium glutamicum* under oxygen deprivation" *Applied Microbiology and Biotechnology*, Jan. 10, 2008, pp. 449-454, vol. 78, No. 3.

Database WPI [Online] Accession No. 2012-K88398, Jan. 27, 2011, pp. 1-2, XP-002759107.

Written Opinion in International Application No. PCT/EP2016/081205, dated Jun. 1, 2017, pp. 1-19.

PROCESS FOR DEGRADING PLASTIC PRODUCTS

CROSS-REFERENCE TO RELATED APPLICATION

This application is the U.S. national stage application of International Patent Application No. PCT/EP2017/062028, filed May 18, 2017.

The present invention relates to processes for degrading plastic products and the uses thereof. The processes of the invention particularly comprise a step of amorphizing a plastic product prior to a step of depolymerization. The processes of the invention are particularly useful for degrading a plastic product comprising polyethylene terephthalate and/or polylactic acid. The invention also relates to a method of producing monomers and/or oligomers from a plastic product comprising at least one polyester, particularly polyethylene terephthalate and/or polylactic acid, comprising submitting the plastic product both to an amorphization step and to a depolymerization step.

BACKGROUND

Plastics are inexpensive and durable materials, which can be used to manufacture a variety of products that find use in a wide range of applications. As a consequence, the production of plastics has increased dramatically over the last decades. Moreover, more than 50% of these plastics are used for single-use disposable applications, such as packaging, agricultural films, disposable consumer items or for short-lived products that are discarded within a year of manufacture. Because of the durability of the polymers involved, substantial quantities of plastics are piling up in landfill sites and in natural habitats worldwide, generating increasing environmental problems. Even degradable and biodegradable plastics may persist for decades depending on local environmental factors, like levels of ultraviolet light exposure, temperature, presence of suitable microorganisms, etc.

Different solutions have been studied to reduce environmental and economic impacts correlated to the accumulation of plastic, from plastic degradation to plastic recycling, including reprocessing the degraded plastic in new plastic material.

As an example, in recent years, polyethylene terephthalate (PET), an aromatic polyester produced from terephthalic acid and ethylene glycol, has been widely employed in the manufacture of several products for human consumption, such as food and beverage packaging (e.g.: bottles, convenience-sized soft drinks, pouches for alimentary items) or textiles, fabrics, rugs, carpets, etc.

In parallel, PET is the most closed-loop recycled plastic. Generally speaking, PET wastes are subjected to successive treatments leading to recycled PET (rPET). PET wastes (mainly bottles) are collected, sorted, pressed into bales, crushed, washed, chopped into flakes, melted and extruded in pellets and offered for sale. Then, these recycled PET may be used to create fabrics for the clothing industry or new packaging such as bottles or blister packs, etc.

However, such plastic recycling processes are adapted to plastic items containing only PET, and thus need a prior extensive sorting. Such plastic recycling processes thus lead to downgrading applications and are also expensive, so that the recycled products are generally non-competitive compared to virgin plastic.

Another potential process for recycling plastic consists of chemical recycling allowing recovering the chemical constituents of the polymer. The resulting monomers, after purification, may be used to re-manufacture plastic items or to make other synthetic chemicals. However, up to now, such recycling process has only been performed on sorted or partially sorted polymers and is not efficient on raw plastic products that may comprise a mix of different polymers.

Thus, a need exists for an improved process for degrading plastic products that does not require preliminary sorting and/or expensive pretreatments and that may be used with industrial yield.

SUMMARY OF THE INVENTION

The present invention provides novel methods for degrading plastic products containing polyesters, which comprise a step of amorphizing the plastic product and a step of depolymerization. Advantageously, the amorphization step allows to decrease the degree of crystallinity of a polyester of the plastic product and thereby favors subsequent depolymerization. By combining amorphization and depolymerization, a high level of degradation is obtained without sorting and under industrial conditions. The methods of the invention are particularly useful for degrading plastic products containing polyethylene terephthalate.

In this regard, it is an object of the invention to provide a process for degrading a plastic product containing at least one polyester, comprising the steps of:

a. Amorphizing at least partially at least one polyester of the plastic product; and b. Depolymerizing said at least partially amorphized polyester of the plastic product.

It is also another object of the invention to provide a method for producing monomers and/or oligomers from a plastic product containing at least one polyester, comprising submitting the plastic product to an amorphization step to amorphize at least partially a polyester of the plastic product, and to a subsequent depolymerization step to depolymerise said at least partially amorphized polyester of the plastic product. According to the invention, the depolymerization step is a biological depolymerization, wherein the plastic product is exposed to a depolymerase. It is a further object of the invention to provide a method for recycling a plastic product comprising at least one polyester, comprising subjecting successively said at least one polyester to amorphization and depolymerization, and recovering monomers and/or oligomers.

It is also an object of the invention to provide a method for treating a plastic product comprising at least one polyester, wherein the plastic product is subjected to amorphization and depolymerization.

In a particular embodiment, the amorphization step comprises submitting the plastic product to a temperature above the crystallization temperature (Tc), preferably above the melting temperature (Tm) of a polyester of the plastic product.

In addition, the amorphization step comprises submitting the plastic product to shear stress. In a particular embodiment, the amorphization step further comprises, upon heating, submitting the plastic product to a temperature below the glass transition temperature (Tg) of said polyester.

In a particular embodiment, the process comprises a subsequent biological depolymerization step, wherein the plastic product is contacted with a depolymerase and/or a microorganism expressing and excreting a depolymerase. Advantageously, the depolymerase is selected from cutinases, lipases, proteases, carboxylesterases and esterases, preferably from cutinases and proteases.

It is therefore an object of the invention to provide a process for degrading a plastic product containing at least one polyester, comprising the steps of:
a) Amorphizing at least partially at least one polyester of the plastic product by submitting successively the plastic product to a temperature above the crystallization temperature (Tc), preferably above the melting temperature (Tm) of a polyester of the plastic product and to a temperature below the glass transition temperature (Tg) of said polyester; and
b) Depolymerizing said at least partially amorphized polyester of the plastic product by contacting the plastic product of step a) with a depolymerase and/or a microorganism expressing and excreting a depolymerase.

Advantageously, the plastic product comprises semi-crystalline polyesters, preferably polyethylene terephthalate and/or polylactic acid.

It is a further object of the invention to provide a process for degrading a plastic product containing PET, comprising the steps of:
a. Amorphizing at least partially PET of the plastic product; and
b. Depolymerizing PET of the plastic product,
wherein the amorphizing step comprises exposing the plastic product to a temperature at or above 245° C., preferably comprised between 250° C. and 300° C., then exposing the plastic product to a temperature comprised between 4° C. and 65° C., and/or the depolymerising step comprises submitting the plastic product to a cutinase.

These and the other objects and embodiments of the invention will become more apparent after the detailed description of the invention, including preferred embodiments thereof given in general terms.

LEGEND TO THE FIGURES

FIG. 1: Depolymerization of Volvic® bottles before (VB1) and after an amorphization step according to the invention (VB2, VB3). The initial rate of enzymatic depolymerization was improved 8.2 times and 9.8 times for amorphized samples VB2 and VB3 respectively, in comparison with non-treated Volvic® bottle (sample VB1). At the end of the reaction, 88% and 84% of amorphized samples VB2 and VB3 were enzymatically degraded, respectively, whereas only 12% of crystalline Volvic® sample VB1 were enzymatically degraded.

Figure 2:
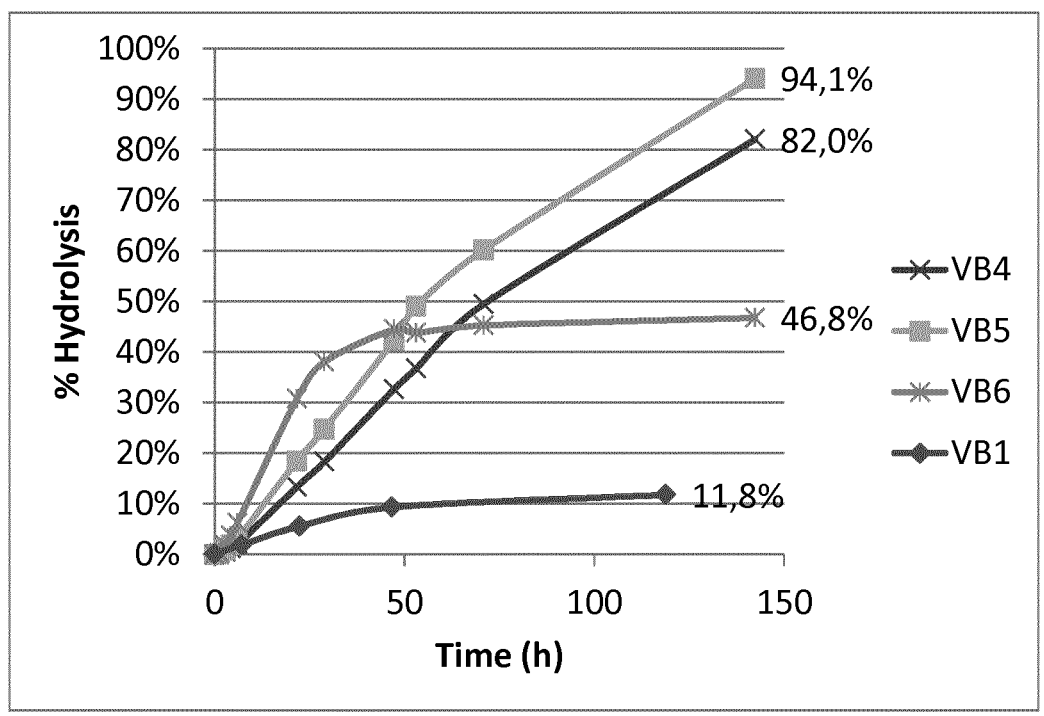

FIG. 2: Depolymerization of Volvic® bottles before (VB1) and after an amorphization step according to the invention (VB4, VB5, VB6). The initial rate of enzymatic depolymerization was improved 3.6 times, 4.8 times and 8.4 times for amorphized samples VB4, VB5 and VB6 respectively, in comparison with non-treated Volvic® bottle (sample VB1). At the end of the reaction, 82%, 94% and 47% of amorphized samples VB4, VB5 and VB6 were enzymatically degraded, respectively, whereas only 12% of crystalline Volvic® sample VB1 were enzymatically degraded.

Figure 3:
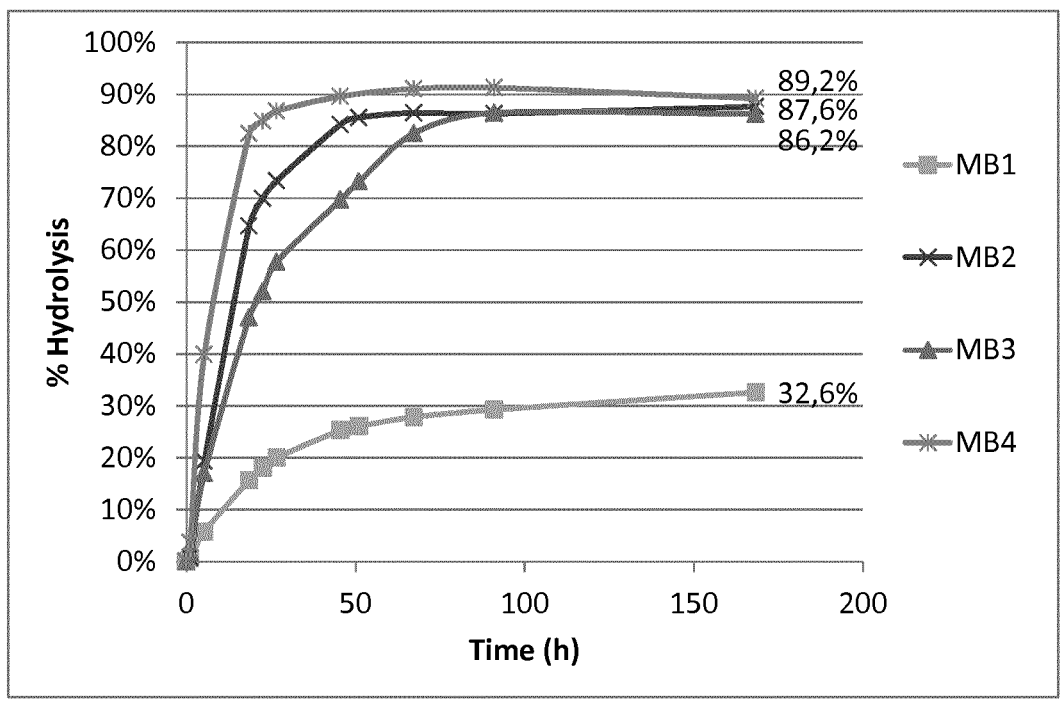

FIG. 3: Depolymerization of milk bottles before (MB1) and after an amorphization step according to the invention (MB2, MB3, MB4). The initial rate of enzymatic depolymerization was improved 3.2 times, 4.6 times and 10 times for amorphized samples MB3, MB2 and MB4 respectively, in comparison with non-treated milk bottle (sample MB1). At the end of the reaction, 86%, 88% and 89% of amorphized samples MB3, MB2 and MB4 were enzymatically degraded, respectively, whereas only 33% of crystalline milk bottle sample MB1 were enzymatically degraded.

Figure 4:
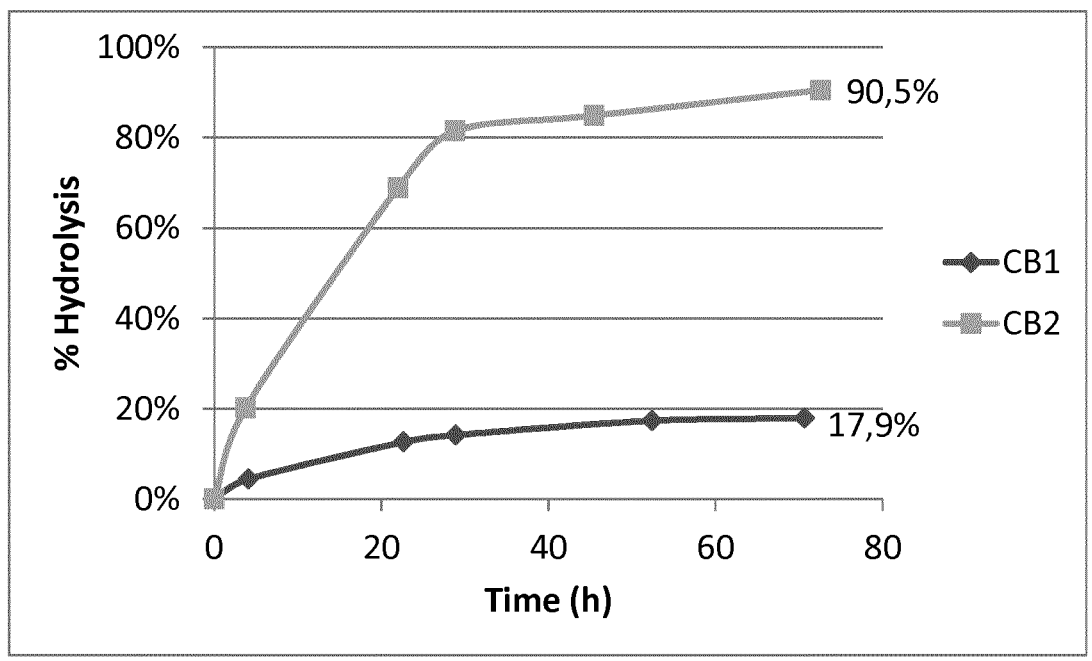

FIG. 4: Depolymerization of Cristaline™ water bottles before (CB1) and after amorphization according to the invention (CB2). At the end of the reaction 90.5% of amorphized Cristaline™ bottle sample CB2 was enzymatically degraded, whereas only 18% of crystalline Cristaline™ bottle sample CB1 were enzymatically degraded.

DETAILED DESCRIPTION OF THE INVENTION

Definitions

The present disclosure will be best understood by reference to the following definitions.

Within the context of the invention, the terms "plastic article" or "plastic product" are used interchangeably and refer to any item or product comprising at least one polymer, such as plastic sheet, tube, rod, profile, shape, massive block, fiber, etc. Preferably, the plastic article is a manufactured product, such as rigid or flexible packaging, agricultural films, bags and sacks, disposable items or the like, carpet scrap, fabrics, textiles, etc. The plastic article may contain additional substances or additives, such as plasticizers, minerals, organic fillers or dyes. In the context of the invention, the plastic article may comprise a mix of semi-crystalline and/or amorphous polymers and/or additives.

A "polymer" refers to a chemical compound or mixture of compounds whose structure is constituted of multiple repeating units (i.e. "monomers") linked by covalent chemical bonds. Within the context of the invention, the term "polymer" includes natural or synthetic polymers, comprising a single type of repeating unit (i.e., homopolymers) or different types of repeating units (i.e., block copolymers and random copolymers). As an example, synthetic polymers include polymers derived from petroleum oil, such as polyolefins, aliphatic or aromatic polyesters, polyamides, polyurethanes and polyvinyl chloride. Natural polymers include lignin, polysaccharides, such as cellulose, hemi-cellulose, starch, and polyhydroxyalkanoates and derivatives thereof.

According to the invention, "oligomers" refer to molecules containing from 2 to about 20 monomer units. As an example, oligomers retrieved from PET include methyl-2-hydroxyethyl terephthalate (MHET) and/or bis(2-hydroxyethyl) terephthalate (BHET) and/or 2-hydroxyethyl benzoate (HEB) and/or dimethyl terephthalate (DMT). As another example, oligomers of lactic acid may be retrieved from PLA.

Within the context of the invention, the term "polyester" refers to a polymer that contain the ester functional group in their main chain. Ester functional group is characterized by a carbon bound to three other atoms: a single bond to a carbon, a double bond to an oxygen, and a single bond to an oxygen. The singly bound oxygen is bound to another carbon. According to the composition of their main chain, polyesters can be aliphatic, aromatic or semi-aromatic. Polyester can be homopolymer or copolymer. As an example, polyethylene terephthalate is a semi-aromatic copolymer composed of two monomers, terephthalic acid and ethylene glycol.

In the context of the invention, "crystalline polymers" or "semi-crystalline polymers" refer to partially crystalline polymers wherein crystalline regions and amorphous regions coexist. The degree of crystallinity of a semi-crystalline polymer may be estimated by different analytical methods and typically ranges from 10 to 90%. For instance, Differential Scanning calorimetry (DSC) or X-Ray diffraction may be used for determining the degree of crystallinity of polymers. Other techniques are also suited for estimating with less reliability polymer's crystallinity, such as Small Angle X-ray Scattering (SAXS) and Infrared Spectroscopy. In the present disclosure, the degrees of crystallinity disclosed correspond to degrees of crystallinity measured with DSC. More particularly, the DSC experiments were conducted as follow: a small quantity of the sample (several mg) is heated at a constant heating rate, from ambient or sub-ambient temperature to a high temperature that is higher than the Tm of the polyester. The heat flow data is collected and plotted against temperature. The degree of crystallinity Xc (%) is calculated as:

$$Xc(\%) = \frac{(\Delta Hf - \Delta Hcc)}{\text{wt} * \Delta Hf 100\%} \times 100\%$$

where $\Delta H_f$ is the enthalpy of melting that can be determined by integrating the endothermic melting peak, $\Delta H_{cc}$ is the enthalpy of cold crystallization and determined by integrating the exothermic cold crystallization peak, $w_t$ the weight fraction of polyester in the plastic, and $\Delta H_{f,100\%}$ is the enthalpy of melting for a fully crystalline polymer and can be found in literature.

As an example, $\Delta H_{f,100\%}$ of PET is taken from literature as 125.5 J/g (Polymer Data Handbook, Second Edition, Edited by James E. Mark, OXFORD, 2009). According to the literature, $\Delta H_{f,100\%}$ of PLA is equal to 93 J/g (Fisher E. W., Sterzel H. J., Wegner G., Investigation of the structure of solution grown crystals of lactide copolymers by means of chemical reactions, Kolloid Zeitschrift & Zeitschrift fur Polymere, 1973, 251, p 980-990).

As used herein, the terms "amorphization" or "amorphizing" are used interchangeably to refer to a step decreasing the degree of crystallinity of a given polymer compared to the degree of crystallinity before the amorphizing step. Preferably, the amorphizing step allows to decrease the crystallinity of a target polymer of at least 5%, 10%, 15%, 20%, 25%, 30%, 35%, 40%, 50%, 60%, 70%, 80%, 90% compared to its degree of crystallinity before amorphization. Advantageously, the amorphization step, in the meaning of the invention, leads to a polymer in the plastic product with at most 30%, preferably at most 25%, more preferably at most 20% of crystallinity, even more preferably at most 15%. Preferably, the amorphization step allows to decrease the crystallinity of a target polymer of at least 5%, 10%, 20%, 30%, 40% compared to the degree of crystallinity before the amorphizing step, leading to a polymer with at most 25%, preferably at most 20% and more preferably at most 15% of crystallinity.

A "degrading process" in relation to a plastic article refers to a process by which at least one polymer of said plastic article is degraded in smaller molecules, such as monomers, oligomers, water and/or carbon dioxide.

In the context of the invention, "Tg", "Tc", "Tcc", and "Tm" respectively refer to the glass transition temperature, the crystallization temperature, the cold crystallization temperature and the melting temperature of a polymer. Such temperatures may be estimated by different analytical methods well known by the person skilled in the art. For instance, Differential Scanning calorimetry (DSC) or Differential thermal analysis (DTA) may be used for determining the Tg, Tc, Tcc, and Tm of polymers. In the present disclosure, Tg, Tc, Tcc, and Tm of polymers disclosed correspond to temperatures measured with DSC.

Amorphization Step

The inventors have shown that it is possible to improve the degradability of a plastic product comprising polyesters by submitting the plastic product to conditions favouring amorphization of a given polyester prior to a depolymerisation thereof. The amorphizing step allows to break at least partially the crystalline structure of at least one polyester of the plastic product.

In a particular embodiment, the amorphization step comprises submitting the plastic product to a temperature at which the plastic product is in a partially or totally molten state.

It is therefore an object of the invention to provide a process of degrading a plastic article, wherein the step of amorphizing comprises submitting the plastic product to a temperature above the crystallization temperature (Tc) of a polyester of the plastic product, preferably at or above the melting temperature (Tm) of said polyester. Particularly, the plastic product is submitted to a temperature corresponding to the Tm of a polyester of the plastic product. Even more preferably, the plastic product is submitted to a temperature corresponding to the Tm+5 to 25° C., preferably Tm+10 to 25° C., more preferably Tm+15 to 25° C., such as Tm+20° C. of a polyester of the plastic product. In another embodiment, the plastic product is submitted to a temperature corresponding to the Tm+25 to 50° C. In another preferred embodiment, the plastic product is submitted to a temperature corresponding to Tm+50° C. or above.

According to the invention, the plastic product may comprise different polyesters. In such case, the plastic product is advantageously submitted to a temperature at or above the Tc or at or above the Tm of the target polyester, i.e.; for which a depolymerization is intended. Alternatively, the plastic product is submitted to a temperature at or above the highest Tc or Tm of the polyesters contained in the plastic product. Such embodiment may lead to the amorphization of all polyesters contained in the plastic product.

In a particular embodiment, the plastic product further comprises thermoplastic polymers other than a polyester. In such a case, the plastic product may be alternatively submitted to a temperature at or above the Tc or at or above the Tm of the target polyester, or to a temperature above the highest Tc or Tm of the thermoplastic polymers contained in the plastic product.

The temperature of the amorphizing step can be adapted by a person skilled in the art depending on the targeted polyester. Generally speaking, the plastic product shall be subjected to the heat treatment for a period of time sufficient to obtain amorphization of the targeted polyester. For instance, such duration may be comprised between 10 seconds and several minutes, depending on the temperature and/or the plastic product.

In a particular embodiment, the plastic product comprises PET, and the amorphizing step comprises submitting the plastic product to a temperature above 170° C., preferably at or above 245° C. and more preferably to a temperature between 250° C. and 300° C. Even more preferably, the plastic product comprising PET is submitted to a temperature between 260° C. and 280° C. In another embodiment, the plastic product comprising PET is submitted to a temperature at or above 300° C., preferably between 300° C. and 320° C.

In another particular embodiment, the plastic product comprises PLA, and the amorphizing step comprises submitting the plastic product to a temperature above 110° C.

and more preferably at or above 145° C. In a particular embodiment, the plastic product comprises PLLA, and the amorphizing step comprises submitting the plastic product to a temperature at or above 180° C.

In another embodiment, the plastic product comprises stereocomplex PLA and the amorphizing step comprises submitting the plastic product to a temperature at or above 230° C.

In a preferred embodiment, the amorphization step comprises submitting the plastic product to both a shear stress and to a temperature above the Tc of a polyester of the plastic product, preferably at or above the Tm of said polyester. The heating and shear stress are preferably performed at the same time to increase amorphization.

In a particular embodiment, the step of amorphizing may further comprise, following the heating of the plastic product, a cooling of said plastic product, in order to fix the plastic product into the amorphized state. Advantageously, the cooling is performed immediately after the heating.

In a particular embodiment, the cooling is performed by submitting the heated plastic product to a temperature below the glass transition temperature (Tg) of a polyester of the plastic product.

In another particular embodiment, the cooling is performed by submitting the heated plastic product to a temperature below the Tc of a polyester of the plastic product. This particular embodiment is particularly adapted to PBAT for instance or to any polyester whose Tg is inferior to 20° C. Alternatively, the cooling is performed by submitting the heated plastic product to a temperature that is at least 20° C. lower than the Tc, preferably at least 30° C., 40° C., 50° C.

In a particular embodiment, the cooling is performed by submitting the plastic product to room temperature (i.e.; 25° C.+/−5° C.). In another embodiment, the cooling is performed by submitting the plastic product to a temperature of about 10° C., preferably about 5° C.

In a particular embodiment, the plastic product is submitted to a cooling temperature subsequently to the heating phase, particularly less than 1 minute, preferably less than 30 seconds, more preferably less than 20 seconds, even more preferably less than 10 seconds after the heating phase.

As an example, the cooling may be performed by immersing the plastic product into a liquid at a temperature below the Tg of a given polyester. For instance, the plastic product is immersed into a liquid at room temperature, more preferably below room temperature. More preferably, the plastic article is immersed in a cold liquid, whose temperature is below 14° C., preferably below 10° C. or below 5° C. In a particular embodiment, the plastic product is immersed into cold water, such as water at or below 5° C.

Alternatively, the cooling may be obtained by submitting the plastic product to cold air. As another example, such plastic article may be cooled by cooling air system.

Alternatively or in addition, the cooling may be performed using an underwater pelletizer where polymer is directly cut in cold water using a thermoregulated water system, the plastic is pelletized into fine pellets. Particularly, such underwater granulator may be fixed in the head of the extruder used for submitting the plastic product to the prior heating, such as the ones sold by Gala Industries® or ECON Underwater Pelletizing System®. Preferably, the cooling may be performed using a microgranulation underwater pelletizer leading to micro granulates or mini pellets with a size below 1 mm. Such process advantageously permits to remove the step of grinding between amorphization and depolymerization.

More generally, any method suitable for rapidly reducing the temperature of the plastic product may be used.

According to the invention, the plastic product may comprise different polyesters. In such case, the plastic product is advantageously submitted to a temperature below the Tc or the Tg of the polyester for which the depolymerization is intended. Alternatively, the plastic product is submitted to a temperature below the lowest Tc or Tg of the polyesters contained in the plastic product. When such polyester has a Tg below 0° C., the plastic product is advantageously submitted to a temperature below room temperature, preferably below 20° C. When such polyester has a Tg below 20° C., the plastic product is advantageously submitted to a temperature below room temperature, preferably below 20° C.

In another embodiment, the plastic product further comprises thermoplastic polymers other than polyester. In such a case, the plastic product is alternatively submitted to a temperature below the Tc or the Tg of the polyester for which the depolymerization is intended or to a temperature below the lowest Tc or Tg of the thermoplastic polymers contained in the plastic product. In the case where at least one thermoplastic polymer of the plastic product has a Tg inferior to 20° C., the plastic product may be submitted to a temperature below room temperature, preferably below 20° C.

In a particular embodiment, the step of amorphizing further comprises adding at least one degrading agent. Examples of degrading agents include, without limitation, water, monomers, alcohol, metal alkoxides, plasticizers, etc. Preferably, such degrading agents may be added during the heating phase of the plastic product and/or the shear stress phase of the plastic product.

Preferably, the step of amorphization comprises at least addition of water. Alternatively or in addition, monomers of a polyester of the plastic product are added during the step of amorphization. Preferably, monomers are selected from monomers of the targeted polyester (i.e.: for which a depolymerization is intended). In a particular embodiment, monomers of PET such as monoethylene glycol and/or terephthalic acid and/or isophthalic acid are added during the step of amorphization of a plastic article comprising PET. Particularly, such monomers are added during the heating phase of the plastic article.

Preferably, such degrading agents are added at a concentration below 20% of the total mass (i.e. plastic product and degrading agents), preferably at a concentration between 0.05 and 10%, more preferably between 0.05 and 5%, before to be submitted to the amorphization step. In another embodiment, such degrading agents are added at a concentration between 0.1 and 10%, more preferably between 0.1 and 5%, before to be submitted to the amorphization phase.

In a particular embodiment, water is added during the heating phase of the plastic article at a concentration above 5% of the total mass, preferably between 10 and less than 20%. Alternatively or in addition, monomers are added during the heating phase of the plastic article at a concentration below 10% of the total mass, preferably below 5%, 4%, 3%, 2%, 1%.

In a particular embodiment, the amorphization step is performed using an extruder. The extruder allows to submit a plastic product both to a given temperature and to shear stress, simultaneously or sequentially. It is also possible to add degrading agent(s) in the extruder, if required. The extruder may further allow to cool the plastic product. Accordingly, the use of an extruder, such as single-screw extruders, multi-screw extruders of either co-rotating or counter-rotating design, planetary roller extruder, dispersive kneaders, reciprocating single-screw extruder (co-kneaders), mini extruder or internal mixer may be of particular interest to implement the amorphization step. Preferably, an underwater pelletizer producing mini pellets under 1 mm is fixed in the head of the extruder to allow the production of plastic pellets with desired size and to replace the potential step of grinding needed before depolymerisation.

Amorphization may also be performed by implementing any process allowing to break at least partially the crystalline structure of at least one polyester of the plastic product.

Alternatively, the amorphization step may be carried out in a reactor, or via atomization of the polyester, or solubilization of the polyester in a solvent, or plasma treatment, or electronic or atomic irradiation or cryogenic mechanical attrition (Schexnaydre et al, 2008), or any techniques known by a person skilled in the art.

Depolymerization Step

According to the invention, the degrading process comprises, following the amorphizing step, a step of depolymerization. According to a preferred embodiment, the depolymerizing step targets at least one polyester targeted by the prior amorphizing step.

The depolymerizing step may comprise a chemical depolymerization and/or a biological depolymerization, preferably, at least a biological depolymerization.

Accordingly, in a particular embodiment, the degrading process of the invention comprises contacting the plastic product with a depolymerase (i.e., an enzyme). Preferably, the depolymerase is able to degrade at least one polyester of the plastic product, preferably at least a polyester that has been previously amorphized by the amorphizing step.

The depolymerase is advantageously selected from the group consisting of a cutinase, a lipase, a protease, a carboxylesterase, a p-nitrobenzylesterase, an esterase, a scl-PHA depolymerase, a mcl-PHA depolymerase, a PHB depolymerase. In a particular embodiment, the plastic product is contacted with at least two different depolymerases.

In a particular embodiment, the plastic product comprises PET, and the depolymerase is a cutinase, preferably selected from *Thermobifida cellulosityca, Thermobifida halotolerans, Thermobifida fusca, Thermobifida alba, Bacillus subtilis, Fusarium solani pisi, Humicola insolens, Sirococcus conigenus, Pseudomonas mendocina* and *Thielavia terrestris*, or any functional variant thereof. In another embodiment, the cutinase is selected from a metagenomic library such as LC-Cutinase described in Sulaiman et al., 2012 or any functional variant thereof. In another particular embodiment, the depolymerase is a lipase preferably selected from *Ideonella sakaiensis*. In another particular embodiment, the depolymerase is a cutinase selected from *Humicola insolens*, such as the one referenced A0A075B5G4 in Uniprot or any functional variant thereof. In another embodiment, the depolymerase is selected from commercial enzymes such as Novozym 51032 or any functional variant thereof.

In a particular embodiment, the plastic product comprises PLLA, and the depolymerase is a protease, preferably selected from *Amycolatopsis* sp., *Amycolatopsis orientalis*, proteinase K from *Tritirachium album, Actinomadura keratinilytica, Laceyella sacchari* LP175, *Thermus* sp. or any commercial enzymes known for degrading PLA such as Savinase®, Esperase®, Everlase® or any functional variant thereof.

In another particular embodiment, the plastic product comprises PDLA, and the depolymerase is a cutinase or a lipase preferably selected from CLE from *Cryptococcus* sp., lipase PS from *Burkholderia cepacia, Paenibacillus amylolyticus* TB-13, *Candida Antarctica, Rhiromucor miehei, Saccharomonospora viridis, Cryptococcus magnus* or any commercial enzymes known for degrading PLA such as Savinase®, Esperase®, Everlase® or any functional variant thereof.

The enzyme may be in soluble form, or on solid phase such as powder form. In particular, it may be bound to cell membranes or lipid vesicles, or to synthetic supports such as glass, plastic, polymers, filter, membranes, e.g., in the form of beads, columns, plates and the like. The enzyme may be in an isolated or purified form. Preferentially, the enzymes of the invention are expressed, derived, secreted, isolated, or purified from microorganisms. The enzymes may be purified by techniques known per se in the art, and stored under conventional techniques. The enzymes may be further modified to improve e.g., their stability, activity and/or adsorption on the polymer. For instance, the enzymes are formulated with stabilizing and/or solubilizing components, such as water, glycerol, sorbitol, dextrin, including maltodextrine and/or cyclodextrine, starch, propanediol, salt, etc.

In another embodiment, the plastic product is contacted with a microorganism that expresses and excretes the depolymerase. In the context of the invention the enzyme may be excreted in the culture medium or towards the cell membrane of the microorganism wherein said enzyme may be anchored. Said microorganism may naturally synthesize the depolymerase, or it may be a recombinant microorganism, wherein a recombinant nucleotide sequence encoding the depolymerase has been inserted, using for example a vector. For example, a nucleotide molecule, encoding the depolymerase of interest is inserted into a vector, e.g. plasmid, recombinant virus, phage, episome, artificial chromosome, and the like. Transformation of the host cell as well as culture conditions suitable for the host are well known to those skilled in the art.

The recombinant microorganisms may be used directly. Alternatively, or in addition, recombinant enzymes may be purified from the culture medium. Any commonly used separation/purification means, such as salting-out, gel filtration, hydrophobic interaction chromatography, affinity chromatography or ion exchange chromatography may be used for this purpose. In particular embodiments, microorganisms known to synthesize and excrete depolymerases of interest may be used.

According to the invention, several microorganisms and/or purified enzymes and/or synthetic enzymes may be used together or sequentially to depolymerize different kinds of polymers contained in a same plastic article or in different plastic articles.

Advantageously, the microorganism of the invention exhibits a modified metabolism in order to prevent the consumption of the monomers and/or oligomers obtained from the degraded polymers. For example, the microorganism is a recombinant microorganism, wherein the enzymes degrading said monomers and/or oligomers have been deleted or knocked out. Alternatively, the process of the invention may be performed in a culture medium containing at least one carbon source usable by the microorganism so that said microorganism preferentially consumes this carbon source instead of the monomers and/or oligomers.

Advantageously, the plastic article is contacted with a culture medium containing the microorganisms, glucose or the like as a carbon source, as well as an available nitrogen source, including an organic nitrogen source (e.g., peptone, meat extract, yeast extract, corn steep liquor) or an inorganic nitrogen source (e.g., ammonium sulfate, ammonium chloride). If necessary, the culture medium may further contain inorganic salts (e.g., sodium ion, potassium ion, calcium ion, magnesium ion, sulfate ion, chlorine ion, phosphate ion). Moreover, the medium may also be supplemented with trace components such as vitamins and amino acids.

In a particular embodiment, the depolymerase is used under conditions favoring its adsorption on the plastic article, so that the polymer of the plastic article is more efficiently depolymerized up to monomers and/or oligomers. More particularly, the depolymerase may be a mutated enzyme having improved affinity for the polymer of the plastic particle compared to a wild-type enzyme. Alternatively, the depolymerase may be used with plastic-binding proteins or binding modules that enhance the binding between the depolymerase and the polymer of the plastic article.

The time required for depolymerization of at least one polymer of the plastic article may vary depending on the plastic article and its polymer itself (i.e., nature and origin of the plastic article, its composition, shape, molecular weight, etc.), the type and amount of microorganisms/enzymes used, as well as various process parameters (i.e., temperature, pH, additional agents, etc.). More generally, the temperature is maintained below an inactivating temperature, which corresponds to the temperature at which the depolymerase is inactivated and/or the recombinant microorganism does no more synthesize the depolymerase. In a particular embodiment, the temperature is maintained below the Tg of the target polyester to be depolymerized. Advantageously, the pH is adjusted for improving the process efficiency according to several factors, including the targeted polyester, the solubility of the targeted monomers/oligomers and/or the development of coproducts during the process. In a particular embodiment, the pH is adjusted to be maintained at the optimal pH of the depolymerase. One skilled in the art may easily adapt the process parameters to the plastic articles and/or depolymerases.

In a particular embodiment, the plastic product comprises PET, and the process is implemented at a temperature comprised between 20° C. and 90° C., preferably between 30° C. and 80° C., more preferably between 40° C. and 70° C., more preferably between 50° C. to 70° C., even more preferably between 60° C. to 70° C. Furthermore, the process is preferably implemented at a pH between 5-11, preferably between 7-9, more preferably between 7-8.5, even more preferably between 7-8. Advantageously, the process is performed under mixing, preferably under agitation, more preferably under vertical agitation with rotation speed preferably comprised between 30 rpm and 2000 rpm, in order to favor contact between the depolymerase and the plastic product.

In a particular embodiment, the plastic product comprises PLA, and the process is implemented at a temperature comprised between 20° C. and 90° C., preferably between 20° C. and 60° C., more preferably between 30° C. and 55° C., more preferably from 40° C. to 50° C., even more preferably at 45° C. Furthermore, the process is preferably implemented at a pH between 5-11, preferably between 7-10, more preferably between 8.5-9.5, even more preferably between 8-9. In another particular embodiment, the process may be preferably implemented at a pH between 7 and 8. One skilled in the art may easily adapt the pH to the PLA-depolymerase. Advantageously, the process is performed under agitation, preferably comprised between 30 rpm and 2000 rpm, in order to favor contact between the depolymerase and the plastic product.

Additional Optional Steps

In a particular embodiment, the degrading process may comprise a preliminary depolymerising step, performed before the step of amorphization. Preferably, after this preliminary depolymerising step, the non-depolymerized polymers are recovered before to perform the amorphization step.

In a particular embodiment, the degrading process may comprise a pretreatment step to modify mechanically and/or physically and/or chemically and/or biologically the plastic product, said pretreatment step being preferably performed before the amorphizing step and/or before the depolymerising step.

For instance, the pretreatment can physically change the structure of the plastic product, so as to increase the surface of contact between the polymers and the enzymes and/or to facilitate the amorphization step. Alternatively or in addition, the pretreatment allows to decrease the microbial charge coming from wastes.

In a particular embodiment, the plastic article is transformed into an emulsion or a powder, which is added to a liquid medium containing the microorganisms and/or enzymes. Alternatively, the plastic article may be mechanically ground, granulated, pelleted, etc. by cutting, impact, crushing, grinding, fractionation, cryogenic grinding, or the like, to reduce the size and modify the shape of the material prior to be submitted to amorphization and/or to be added to a liquid medium containing the microorganisms and/or enzymes. The mechanical pretreatment can also be a sonication, a centrifugation, a shear, a collisop, a high-pressure homogenizer, a maceration or a liquefaction with a rotary drum, a screw press, a disc screen shredder, or a piston press.

Alternatively or additionally, a thermal pretreatment can be applied, using for example microwaves. Such thermal pretreatment allows disinfection, pasteurization or sterilization of the plastic product.

In another particular embodiment, the plastic product is chemically pretreated to modify its structure and increase the surface of contact between the polymers and the enzymes. A basic, acidic, or ionic liquid, as well as a solvent, can be used. An ozonation can also be implemented.

In a particular embodiment, the plastic article may also be sorted, washed, disinfected, sterilized and/or biologically cleaned prior to degradation.

According to the invention, several pre-treatments may be combined.

In a preferred embodiment, the plastic product containing PET is submitted to a cryogenic grinding, freezer milling, freezer grinding, or cryomilling before the depolymerization step. Preferably, the plastic article is crushed or grinded before the amorphization step and/or before the depolymerization step. Particularly, the plastic product may be physically transformed into film, flakes, powders, pellets or fibers.

Even more preferably, the amorphization step is performed using an extruder and an underwater pelletizer leading to micro granules below 1 mm, such that no cryogenic grinding is needed before the depolymerization step.

Plastic Articles

The inventors have developed a degrading process for degrading plastic articles containing polyesters. The process of the invention may be advantageously used with plastic articles from plastic waste collection and/or post-industrial waste. More particularly, the process of the invention may be used for degrading domestic plastic wastes, including plastic bottles, plastic bags and plastic packaging, soft and/or hard plastics, even polluted with food residues, surfactants, etc. Alternatively, the process of the invention may be used for degrading plastic fibers, such as fibers providing from fabrics, textiles and/or industrial wastes. More particularly, the process of the invention may be used with PET fibers, such as PET fibers providing from fabrics, textile, or tires. Interestingly, the process of the invention allows the production of monomers and/or oligomers that may be further recovered and/or reprocessed.

Advantageously, the process of the invention is used for degrading a plastic product comprising at least one polyester selected from polyethylene terephthalate (PET); polytrimethylene terephthalate (PTT); polybutylene terephthalate (PBT); polyethylene isosorbide terephthalate (PEIT); polylactic acid (PLA)); polyhydroxyalkanoate (PHA) (such as poly(3-hydroxybutyrate) (P(3HB)/PHB), poly(3-hydroxyvalerate) (P(3HV)/PHV), poly(3-hydroxyhexanoate) (P(3HHx)), poly(3-hydroxyoctanoate) (P(3HO)), poly(3-hydroxydecanoate) (P(3HD)), poly(3-hydroxybutyrate-co-3-hydroxyvalerate) (P(3HB-co-3HV)/PHBV), poly(3-hydroxybutyrate-co-3-hydroxyhexanoate) (P(3HB-co-3HHx)/ (PHBHHx)), poly(3-hydroxybutyrate-co-5-hydroxyvalerate) (PHB5HV), poly(3-hydroxybutyrate-co-3-hydroxypropionate) (PHB3HP), polyhydroxybutyrate-co-hydroxyoctonoate (PHBO), polyhydroxybutyrate-co-hydroxyoctadecanoate (PHBOd), poly(3-hydroxybutyrate-co-3-hydroxyvalerate-co-4-hydroxybutyrate) (P(3HB-co-3HV-co-4HB))); polybutylene succinate (PBS), polybutylene succinate adipate (PBSA), polybutylene adipate terephthalate (PBAT), polyethylene furanoate (PEF), polycaprolactone (PCL), poly(ethylene adipate) (PEA), polyethylene naphthalate (PEN), polycyclohexylenedimethylene terephthalate (PCT), poly ethylene succinate (PES), poly(butylene succinate-co-terephthalate) (PBST), poly(butylene succinate/terephthalate/isophthalate)-co-(lactate) (PBSTIL) and blends/mixtures of these polymers.

Preferably, the process of the invention is used for degrading a plastic product comprising at least one thermoplastic polyester, preferably selected from polyethylene terephthalate (PET); polytrimethylene terephthalate (PTT); polybutylene terephthalate (PBT); polyethylene isosorbide terephthalate (PEIT); polylactic acid (PLA)); polyhydroxyalkanoate (PHA) (such as poly(3-hydroxybutyrate) (P(3HB)/PHB), poly(3-hydroxyvalerate) (P(3HV)/PHV), poly(3-hydroxyhexanoate) (P(3HHx)), poly(3-hydroxyoctanoate) (P(3HO)), poly(3-hydroxydecanoate) (P(3HD)), poly(3-hydroxybutyrate-co-3-hydroxyvalerate) (P(3HB-co-3HV)/PHBV), poly(3-hydroxybutyrate-co-3-hydroxyhexanoate) (P(3HB-co-3HHx)/(PHBHHx)), poly(3-hydroxybutyrate-co-5-hydroxyvalerate) (PHB5HV), poly(3-hydroxybutyrate-co-3-hydroxypropionate) (PHB3HP), polyhydroxybutyrate-co-hydroxyoctonoate (PHBO), polyhydroxybutyrate-co-hydroxyoctadecanoate (PHBOd), poly (3-hydroxybutyrate-co-3-hydroxyvalerate-co-4-hydroxybutyrate) (P(3HB-co-3HV-co-4HB))); polybutylene succinate (PBS), polybutylene succinate adipate (PBSA), polybutylene adipate terephthalate (PBAT), polyethylene furanoate (PEF), polycaprolactone (PCL), poly(ethylene adipate) (PEA), polyethylene naphthalate (PEN), polycyclohexylenedimethylene terephthalate (PCT), poly ethylene succinate (PES), poly (butylene succinate-co-terephthalate) (PBST), poly(butylene succinate/terephthalate/isophthalate)-co-(lactate) (PBSTIL) and blends/mixtures of these polymers.

In a particular embodiment, the process of the invention is used for degrading plastic fibers comprising at least one polyester, and preferably at least PET or PLA.

In a particular embodiment, the plastic product comprises at least two different polymers, such as at least two polyesters. More generally, the plastic products targeted by the process of the invention may comprise different kinds of polymers, including synthetic polymers, derived from petrochemicals, or biobased sourced. As an example, the plastic product comprises at least one polyester and further comprises polymers other than a polyester, such as polyamides, polyolefins or vinyl polymers (such as polyethylene, polypropylene, polystyrene, polyvinyl chloride, ethylene vinyl acetate, ethylene vinyl alcohol, or polyvinyl alcohol), rubber, wood or wood compounds such as lignin, cellulose or hemi-cellulose, and starch and derivatives thereof. As another example, the plastic product may comprise at least one polyester and further comprises an additional component such as metal compounds (such as aluminum, aluminum oxide, titanium, titanium oxide, nickel or chrome), mineral compounds (such as silica or silicon dioxide, glass, or mica), glass compounds, natural or synthetic fibers (such as carbon fibers, flax fibers, hemp fibers, wood fibers, paper fibers, straw fibers, jute fibers, cotton fibers, viscose fibers, glass fibers, metal fibers, aramid fibers, boron fibers, or ceramic fibers), paper, and derivatives thereof.

In a preferred embodiment of the invention, the plastic product comprises aromatic polyesters, such as polyethylene terephthalate and/or polytrimethylene terephthalate. Advantageously, the plastic product comprises or is constituted of PET, preferably semi-crystalline PET. In the context of the invention, the terms "Polyethylene terephthalate" or "Polyethylene terephthalate polymer", also abbreviated "PET" or "PETE", are used interchangeably and refer to a thermoplastic polymer resin of the polyester family, produced from monomers of monoethylene glycol (MEG) and dimethyl terephthalate (DMT) or purified terephthalic acid (PTA). PET may exist both in amorphous and in semi-crystalline states. In the context of the invention, homopolymers and copolymers of PET are also encompassed. Examples of copolymers are polyethylene terephthalate glycol-modified (PETG), wherein cyclohexane dimethanol is added to the polymer backbone in place of ethylene glycol, or polyethylene terephthalate isophthalic acid-modified, wherein isophthalic acid replaces some of the linkage of terephthalate units, or bi-axially oriented PET (BOPET), or oriented PET (OPET), etc.

In another embodiment, the plastic product comprises aliphatic polyester, such as PLA, and more particularly semi-crystalline PLA. According to the invention, the terms "Polylactic acid" or "Polylactic acid polymer", also abbreviated PLA, are used interchangeably and refer to a thermoplastic polymer resin of the polyester family, produced from monomers of lactic acid (D-lactic acid or L-lactic acid). PLA may exist both in amorphous and in semi-crystalline states. In the context of the invention, homopolymers, copolymers or stereocomplexes of PLA are also encompassed such as poly(L-lactic acid) (PLLA), poly(D-lactic acid) (PDLA), poly(D,L-lactic acid) (PDLLA), or stereocomplex PLA (scPLA).

It is therefore an object of the invention to provide a process for degrading a plastic product containing at least one polyester, comprising the steps of:
 a. Amorphizing at least partially at least one polyester of the plastic product; and
 b. Depolymerizing said at least partially amorphized polyester of the plastic product.

It is also another object of the invention to provide a method of producing monomers and/or oligomers from a plastic product comprising at least a polyester, comprising submitting the plastic product to an amorphization step to amorphize at least partially a polyester of the plastic product, and to a depolymerization step of said polyester of the plastic product, wherein the depolymerization step comprises exposing the plastic product to a depolymerase. According to the invention, the depolymerase is advantageously selected from the group consisting of a cutinase, a lipase, a protease, a carboxylesterase, a p-nitrobenzylesterase, an esterase, a scl-PHA depolymerase, a mcl-PHA depolymerase, a PHB depolymerase.

It is a particular object of the invention to provide a process for degrading a plastic product containing PET, comprising the steps of:

a. Amorphizing at least partially PET of the plastic product by submitting the plastic product to a temperature above 170° C., preferably above 185° C., more preferably above 200° C., even more preferably above 220° C., 240° C., 245° C., 250° C., 255° C., 260° C., 265° C.; and then by submitting the plastic product to a temperature below 80° C., preferably below 65° C., more preferably below 10° C.; and b. Depolymerizing PET of the plastic product by contacting the plastic product to a depolymerase, preferably a cutinase.

It is another particular object of the invention to provide a process for degrading a plastic product containing PLA, comprising the steps of:

a. Amorphizing at least partially PLA of the plastic product by submitting the plastic product to a temperature above 110° C., preferably above 160° C., more preferably above 170° C.; and then by submitting the plastic product to a temperature below 85° C., preferably below 55° C., more preferably below 10° C.; and b. Depolymerizing PLA of the plastic product by contacting the plastic product to a depolymerase, preferably a protease.

It is therefore an object of the invention to provide a method for producing terephthalic acid and/or ethylene glycol and/or methyl-2-hydroxyethyl terephthalate (MHET) and/or bis(2-hydroxyethyl) terephthalate (BHET) and/or 2-hydroxyethyl benzoate (HEB) and/or dimethyl terephthalate (DMT), from a plastic product comprising PET, wherein the plastic product is submitted to an amorphization step to amorphize at least partially PET of the plastic product, and to a depolymerising step of the PET of the plastic product, wherein the depolymerizing step comprises exposing the plastic product to a cutinase.

It is therefore another object of the invention to provide a method for producing lactic acid, from a plastic product comprising PLA, wherein the plastic product is submitted to an amorphization step to amorphize at least partially PLA of the plastic product, and to a depolymerising step of the PLA of the plastic product, wherein the depolymerizing step comprises exposing the plastic product to a protease.

It is also another object of the invention to provide a process of degrading a plastic article further comprising a step of purification of the monomers and/or oligomers resulting from the step of depolymerization. Monomers and/or oligomers resulting from the depolymerization may be recovered, sequentially or continuously. A single type of monomer and/or oligomers or several different types of monomers and/or oligomers may be recovered, depending on the polymers and/or the starting plastic articles.

It is a further object of the invention to provide a method for recycling a plastic product comprising at least one polyester, comprising subjecting successively said at least one polyester to amorphization and depolymerization, and recovering monomers and/or oligomers.

The recovered monomers and/or oligomers may be purified, using all suitable purifying method and conditioned in a re-polymerizable form. Examples of purifying methods include stripping process, separation by aqueous solution, steam selective condensation, filtration and concentration of the medium after the bioprocess, separation, distillation, vacuum evaporation, extraction, electrodialysis, adsorption, ion exchange, precipitation, crystallization, concentration and acid addition dehydration and precipitation, nanofiltration, acid catalyst treatment, semi continuous mode distillation or continuous mode distillation, solvent extraction, evaporative concentration, evaporative crystallization, liquid/liquid extraction, hydrogenation, azeotropic distillation process, adsorption, column chromatography, simple vacuum distillation and microfiltration, centrifugation, ultrafiltration, combined or not.

Particularly, the invention provides a process of degrading a plastic product comprising PET wherein preferred recovered monomers are selected from monoethylene glycol and terephthalic acid, and preferred oligomers are selected from methyl-2-hydroxyethyl terephthalate (MHET), bis(2-hydroxyethyl) terephthalate (BHET), 2-hydroxyethyl benzoate (HEB) and dimethyl terephthalate (DMT).

Particularly, the invention provides a process of degrading a plastic product comprising PLA wherein preferred recovered monomers are selected from lactic acid, particularly D-lactic acid or L-lactic acid.

In a preferred embodiment, the repolymerizable monomers and/or oligomers may then be reused to synthesize polymers, preferably polyesters. Advantageously, polymers of same nature are repolymerized. However, it is possible to mix the recovered monomers and/or oligomers with other monomers and/or oligomers, in order to synthesize new copolymers. Initiators may be added to the monomers/oligomers solution to favor the polymerization reaction. One skilled in the art may easily adapt the process parameters to the monomers/oligomers and the polymers to synthesize.

In addition or alternatively, a step of recovering the non-depolymerized polymers is further performed after the step of depolymerization. Particularly, such polymers may be constituted of the crystalline part of the polyester originally submitted to the step of depolymerization and/or different polymers constituting the plastic article. Examples of recovering methods include filtration, microfiltration, separation, solvent extraction, solvent solubilization and evaporation, liquid/liquid extraction, decantation, centrifugation.

Further aspects and advantages of the invention will be disclosed in the following examples, which should be considered as illustrative and do not limit the scope of this application. The following is a description of the present invention, including preferred embodiments thereof given in general terms. The present invention is further exemplified in the disclosure given under the heading "Examples" herein below, which provides experimental data supporting the invention and means of performing the invention.

EXAMPLES

Example 1—Process of Degrading a Plastic Product Containing PET: Volvic® Bottles A) Amorphizing Step Volvic® water bottles were collected after use. Caps and adhesive labels were removed. Then the bottles were ground into flakes using a Rapid 150 Delta Tech granulator. A first sample (VB1) was collected.

The initial degree of crystallinity (Xc) of flakes was estimated using a Mettler Toledo DSC 3 with heating rate of 10° C./min. The measured initial crystallinity was 26%. The different temperatures characterizing VB1 were also measured:
Glass transition temperature—Tg=67° C.,
Cold crystallization temperature—Tcc=134° C.
Melting temperature—Tm=250° C.

The amorphizing step was performed using a twin screw extruder Leistritz ZSE 18 MAXX, which comprises nine successive heating zones (Z1-Z9) wherein the temperature may be independently controlled and regulated, and a head (Z10).

In a first embodiment, Volvic® bottle flakes VB1 were introduced in the principal hopper (before Z1). Temperature profile all along the screw is described in Table 1. The screw speed rate was 30 rpm.

TABLE 1

Temperature profile of extruder used for VB2 and VB3

| Zone | | | | | | | | | | |
|---|---|---|---|---|---|---|---|---|---|---|
| | Z1 | Z2 | Z3 | Z4 | Z5 | Z6 | Z7 | Z8 | Z9 | Z10 (head) |
| T° C. | 170° C. | 230° C. | 250° C. | 260° C. | 270° C. | 270° C. | 270° C. | 260° C. | 250° C. | 250° C. |

The molten polymer arrived in the screw head (Z10) comprising a die plate with one hole of 3.5 mm and was immediately immersed in a 2 m long cold water bath filled with a mix of water and crushed ice. Resulting bath temperature was about 5° C.

The resulting extrudate was granulated into fine solid pellets <3 mm, and a sample VB2 was collected. The degree of crystallinity of VB2, measured by DSC, was 9%.

In a second embodiment, the amorphizing step, as disclosed above (with same extruder parameters and cooling conditions) was performed on VB1, with the addition of water. More particularly, 10% of water by total weight were added directly to Volvic® bottle flakes, then mixed before introducing in the principal hopper (before Z1).

The resulting extrudate was granulated to fine solid pellets <3 mm, and a sample VB3 was collected.

The degree of crystallinity of VB3, measured by DSC, was 11%.

In a third embodiment, the amorphizing step was performed on VB1 with same extruder, same temperature profile as shown in table 1 and same cooling conditions, but with a different speed rate of 60 rpm. The resulting extrudate was granulated to fine solid pellets <3 mm, and a sample VB4 was collected. The degree of crystallinity of VB4, measured by DSC, was 12%.

In a fourth embodiment, the amorphizing step was performed on VB1 with same extruder, same temperature profile as shown in table 1, same cooling conditions, a speed rate of 60 rpm and the addition to flakes of 10% of water by total weight. The resulting extrudate was granulated to fine solid pellets <3 mm, and a sample VB5 was collected. The degree of crystallinity of VB5, measured by DSC, was about 12%.

In a fifth embodiment, the amorphizing step was performed on VB1 with same extruder, same temperature profile as shown in table 1, same cooling conditions, a speed rate of 60 rpm and the addition to flakes of 1% of EG by total weight. The resulting extrudate was granulated to fine solid pellets <3 mm, and a sample VB6 was collected. The degree of crystallinity of VB6, measured by DSC, was 16%.

B) Depolymerization Step a) Enzymatic Depolymerization of Samples VB1, VB2 and VB3:

The subsequent depolymerization, on VB1, VB2 and VB3, was performed with a LC-cutinase produced from recombinant expression in *Escherichia coli* (Sulaiman et al., Appl Environ Microbiol. 2012 March).

For each VB1, VB2 and VB3 samples, 100 mg of samples were respectively weighted and introduced in a dialysis tubing.

1 mL of LC-cutinase at 0.1 mg/mL in 0.1 M potassium phosphate at pH 8 was added in the dialysis tubing before closing it. The dialysis tubing was then introduced in a glass bottle containing 49 mL of 0.1 M potassium phosphate buffer pH 8.

The depolymerization was started by incubating each sample at 70° C. and 150 rpm in a Max Q 4450 incubator (Thermo Fisher Scientific, Inc. Waltham, Mass., USA).

Aliquots of 150 μL of buffer were sampled regularly. If necessary, samples were diluted in 0.1 M potassium phosphate buffer pH 8. Then, 150 μL of methanol and 6.5 μL of HCl 6 N were added to 150 μL of sample.

After mixing and filtering on 0.45 μm syringe filter, samples were analyzed by Ultra High Pressure Liquid Chromatography (UHPLC) to monitor the liberation of terephthalic acid (TA), MHET and BHET. Chromatography system used was an Ultimate 3000 UHPLC system (Thermo Fisher Scientific, Inc. Waltham, Mass., USA) including a pump module, an autosampler, a column oven thermostated at 25° C., and an UV detector at 240 nm. The column used was a Discovery® HS C18 HPLC Column (150×4.6 mm, 5 μm, equipped with precolumn, Supelco, Bellefonte, USA). Eluents were 10 mM $H_2SO_4$ (eluent A), ultra-pure water (eluent B) and methanol (eluent C). TA, MHET and BHET were separated using a gradient of MeOH in water at 1 mM of $H_2SO_4$. Injection was 20 μL of sample. TA, MHET and BHET were measured according to standard curves prepared from commercial TA and BHET and in house synthesized MHET in the same conditions than samples.

The percentage of hydrolysis of Volvic® bottle samples VB1, VB2 and VB3 were calculated based on the ratio of molar concentration at a given time (TA+MHET+BHET) versus the total amount of TA contained in the initial sample. Results of depolymerization are shown in FIG. 1.

The initial rates of enzymatic depolymerization of amorphized samples VB2 and VB3 were improved 8.2 and 9.8 times respectively compared to the hydrolysis initial rate of the non-amorphized VB1. At the end of the reaction, 88% and 84% of amorphized samples VB2 and VB3, respectively, were degraded by the enzyme, whereas only 12% of VB1 was enzymatically degraded.

b) Enzymatic Depolymerization of Samples VB4, VB5 and VB6

The same procedures of samples depolymerization (depolymerase used, pH, T°, agitation, etc.) and degradation analysis as the one described for samples VB1, VB2 and VB3, were applied to samples VB4, VB5 and VB6. Only the temperature during the depolymerization step was different, i.e. 65° C. instead of 70° C.

The percentage of hydrolysis of Volvic® bottle samples VB1, VB4, VB5 and VB6 were calculated, as previously described. Results of depolymerization are shown in FIG. 2.

The initial rates of enzymatic depolymerization of amorphized samples VB4, VB5 and VB6 were improved 3.6 times, 4.8 times and 8.4 times respectively, compared to the hydrolysis initial rate of the non-amorphized sample VB1. At the end of the reaction, 82%, 94% and 47% of amorphized samples VB4, VB5 and VB6 were enzymatically degraded, respectively, whereas only 12% of crystalline Volvic® sample VB1 were enzymatically degraded.

c) Enzymatic Depolymerization of Samples VB1 and VB5 Using HiC Cutinase

The subsequent depolymerization, on VB1 and VB5, was performed with HiC cutinase (*Humicola insolens* cutinase accession number A0A075B5G4 in Uniprot) produced from recombinant expression in *Yarrowia lipolytica*.

A synthetic gene optimized for expression in *Yarrowia lipolytica* and encoding 194 amino acid mature HiC was obtained from Genscript. This sequence was cloned in vector JMP62UraTef downstream of the sequence encoding signal peptide and prodomain (33 N-terminal amino acids) of lipase 2 from *Yarrowia lipolytica* (accession number Q9P8F7). The vector is a derivative of a previously described vector (Nicaud et al (2002) FEMS Yeast Res 2(3):371-379). This vector contains the *Y. lipolytica* TEF promoter and URA3ex excisable selection marker, which are flanked by loxP sites and a Zeta fragment that serves as the homologous integration site.

Vectors were verified by DNA sequencing (GATC Biotechy). Vector was digested using NotI, thus generating a linear DNA with Zeta sequences at both extremities, and purified. The linear DNA fragment was introduced into the Zeta docking platform of *Y. lipolytica* JMY1212 Zeta (Bordes et al. (2007) J Microbiol Methods 70(3):493-502) using the lithium acetate method (Duquesne et al. (2012) Methods Mol Biol 861:301-312). Enzymes were produced in YT2D5 medium (1% w/v yeast extract, 2% w/v tryptone, 5% w/v glucose and 100 mM phosphate buffer, pH 6.8) for 48 h. Culture was harvested and supernatant was collected. Culture supernatant was filtered on 0.2 μm and concentrated using a dialysis tube Amicon Ultra with a cut off of 3 kDa. HiC concentration in the concentrated extract was then estimated using Bradford method.

For each VB1 and VB5 samples, 100 mg of samples were respectively weighted and introduced in a dialysis tubing.

1 mL of HiC cutinase at 0.65 mg/mL in 0.1 M potassium phosphate at pH 8 was added in the dialysis tubing before closing it. The dialysis tubing was then introduced in a glass bottle containing 49 mL of 0.1 M potassium phosphate buffer pH 8. The depolymerization was started by incubating each sample at 60° C. and 150 rpm in a Max Q 4450 incubator (Thermo Fisher Scientific, Inc. Waltham, Mass., USA).

The same procedures of samples degradation analysis as the one described in a) and b) were applied.

The percentage of hydrolysis of Volvic® bottle samples VB1 and VB5 were calculated, as previously described. After 70 hours of reaction, the amorphized sample VB5 shows a degradation rate 173% higher than the VB1 sample.

Example 2—Process of Degrading a Plastic Product Containing PET: Opaque Milk Bottles A) Amorphization by Extrusion of PET Flakes from Opaque Pâturages™ Milk Bottles Opaque milk bottles from Pâturages™ were collected and washed after use. Caps and adhesive labels were removed. Then, the bottles were ground into flakes using a Rapid 150 Delta Tech granulator. A sample from the obtained flakes was micronized using an Ultra Centrifugal Mill ZM 200 system to a fine powder <500 μm size. This first sample was named MB1. The initial degree of crystallinity (Xc) of MB1 powder was estimated using a Mettler Toledo DSC 3 with heating rate of 10° C./min. The measured initial crystallinity was 27%. The different temperatures characterizing MB1 were also measured: Tg=66° C., Tcc=120° C. and Tm=244° C.

The amorphizing step was performed using the same win screw extruder Leistritz ZSE 18 MAXX, as the one described in Example 1.

In a first embodiment, milk bottle flakes were introduced in the principal hopper (before Z1 zone). Temperatures were increased up to 270° C. in Z5, Z6 and Z7 to obtain a molten PET in the die head (see table 1). The screw speed rate set was 30 rpm.

The molten polymer arrived in the screw head (Z10) comprising a die plate with one hole of 3.5 mm and was immediately immersed in a 2 m long cold water bath filled with a mix of water and crushed ice. Resulting bath temperature was about 5° C. The resulting extrudate was granulated to fine solid pellets <3 mm, and was micronized using an Ultra Centrifugal Mill ZM 200 system to a fine powder <500 μm size. This sample was designated sample MB2. The degree of crystallinity of MB2, measured by DSC, was less than 1%.

In a second embodiment, the amorphizing step was performed on milk bottle flakes with same extruder, same temperature profile as table 1, the same cooling conditions, but with a speed rate of 60 rpm. The resulting extrudate was granulated to fine solid pellets <3 mm and was micronized using an Ultra Centrifugal Mill ZM 200 system to a fine powder <500 μm size. This sample was designated sample MB3. The degree of crystallinity of MB3, measured by DSC, was 4%.

In a third embodiment, the amorphizing step as disclosed above was performed on milk bottle flakes with the same temperature profile as table 2, a speed rate of 60 rpm, with addition of water. More particularly, 20% by weigh of water based on the total weight were added directly to the flakes, then mixed before introduction in the principal hopper (before Z1). The same cooling conditions as the first embodiment were used. The resulting extrudate was granulated to fine solid pellets <3 mm, and a sample was collected and micronized using an Ultra Centrifugal Mill ZM 200 system to a fine powder <500 μm size. This sample was designated sample MB4. The degree of crystallinity of MB4, measured by DSC, was 1%.

B) Depolymerization of Amorphized Milk Bottles Using a Cutinase

The subsequent depolymerization, on MB1, MB2, MB3 and MB4, was performed with a LC-cutinase produced from recombinant expression in *Escherichia coli* (Sulaiman et al., Appl Environ Microbiol. 2012 March), using the same material and method as exposed in Example 1.

The hydrolysis of milk bottle samples MB1, MB2, MB3 and MB4 were calculated based on TA, MHET and BHET released as previously described in Example 1. Results of depolymerization are shown in FIG. 3.

Initial rate of enzymatic depolymerization was improved 3.2 times, 4.6 times and 10 times for amorphized samples MB3, MB2 and MB4 respectively, in comparison with micronized milk bottle (sample MB1). At the end of the reaction, 86%, 88% and 89% of amorphized samples MB3, MB2 and MB4 were degraded by the enzyme, respectively, whereas only 33% of crystalline milk bottle sample MB1 were enzymatically degraded.

Another subsequent depolymerization, on MB1 and MB4, was performed with HiC cutinase produced from recombinant expression in *Yarrowia lipolytica* using the same material and method, same procedures of samples depolymerization and degradation analysis as exposed in Example 1B)c).

The percentage of hydrolysis of opaque Pâturages™ milk bottles samples MB1 and MB4 were calculated, as previously described. After 70 hours of reaction, the amorphized sample MB4 shows a degradation rate 152% higher than the MB1 sample.

Example 3—Process of Degrading a Plastic Product Containing PET: Cristaline™ Water Bottles A) Amorphization by Extrusion of PET Flakes from Cristaline™ Water Bottles Cristaline™ water bottles were collected after use. Caps and adhesive labels were removed. Then the bottles were ground into flakes using a Rapid 150 Delta Tech granulator, a sample from flakes was micronized using an Ultra Centrifugal Mill ZM 200 system to a fine powder <500 μm size, this sample was named CB1. The initial degree of crystallinity (Xc) of CB1 powder was estimated using a Mettler Toledo DSC 3 with heating rate of 10° C./min. The measured initial crystallinity was 33%. The different temperatures characterizing CB1 were also measured: Tg=70.5° C., Tcc=128° C., Tf=242° C.

The amorphizing step was performed using the same twin screw extruder Leistritz ZSE 18 MAXX, as the one described in Example 1 and 2. Cristaline™ bottle flakes were introduced in the principal hopper (before Z1 zone). Temperatures were increased up to 270° C. in Z5, Z6 and Z7 to obtain a molten PET in the die head (see table 1). The screw speed rate set was 30 rpm.

The molten polymer arrived in the screw head (Z10) comprising a die plate with one hole of 3.5 mm and was immediately immersed in a 2 m long cold water bath filled with a mix of water and crushed ice. Resulting bath temperature was about 5° C. The resulting extrudate was granulated to fine solid pellets <3 mm and designated, a sample from the obtained pellets was micronized using an Ultra Centrifugal Mill ZM 200 system to a fine powder <5001 μm size, this sample was named CB2. The degree of crystallinity of amorphized and micronized sample CB2 was 2.7%.

B) Enzymatic Depolymerization of Amorphized Cristaline™ Water Bottles in a Reactor Two Minibio 500 bioreactors (Applikon Biotechnology B.V., Delft, The Netherlands) were started with 10 g of samples CB1 or CB2 and 100 mL of 10 mM potassium phosphate buffer pH 8 containing 10 mg of LC-cutinase. Agitation was set at 250 rpm using a marine impeller. Bioreactors were thermostated at 65° C. by immersing them in an external water bath. pH was regulated at 8 by addition of KOH at 3 M. The different parameters (pH, temperature, agitation, addition of base) were monitored thanks to BioXpert software V2.95.

Aliquots of reaction mix were sampled regularly and prepared according to example 1 to performed the measurement.

The percentage of hydrolysis of Cristaline™ bottle samples CB1 and CB2 were calculated based on TA, MHET and BHET released as previously described in Example 1. Results of depolymerization are shown in FIG. 4.

At the end of the reaction, 90.5% of amorphized Cristaline™ bottle sample CB2 was degraded by the enzyme, whereas only 18% of crystalline Cristaline™ bottle sample CB1 were enzymatically degraded.

Another subsequent depolymerization, on CB1 and CB2 was performed with HiC cutinase produced from recombinant expression in *Yarrowia lipolytica* using the same material and method, same procedures of samples depolymerization and degradation analysis as exposed in Example 1B)c).

The percentage of hydrolysis of Cristaline™ bottle samples CB1 and CB2 were calculated, as previously described. After 70 hours of reaction, the amorphized sample CB2 shows a degradation rate 570% higher than the CB1 sample.

Example 4—Process of Degrading a Plastic Product Containing PLA: BioWare Cups

A) Amorphization by Extrusion of PLA Flakes from BioWare Cups

BioWare cups were collected then grounded into flakes using a Rapid 150 Delta Tech granulator. This first sample was named BC1. The initial degree of crystallinity (Xc) of flakes was estimated using a Mettler Toledo DSC 3 with heating rate of 10° C./min. The measured initial crystallinity was 24.2%.

The different temperatures characterizing BC1 were also measured: Tg=64° C., Tcc=113° C., Tm=148° C.

The amorphizing step was performed using the same twin screw extruder Leistritz ZSE 18 MAXX, of example 1, but with a different temperature profile (see table 2 below).

In a first embodiment, BioWare cups flakes BC1 were introduced in the principal hopper (before Z1 zone). The screw speed rate set was 60 rpm.

TABLE 2

| Temperature profile of extruder used for BC2, BC3 | | | | | | | | | |
|---|---|---|---|---|---|---|---|---|---|
| Zone | | | | | | | | | |
| Z1 | Z2 | Z3 | Z4 | Z5 | Z6 | Z7 | Z8 | Z9 | Z10 (head) |
| T° C. 180° C. | 180° C. | 180° C. | 180° C. | 170° C. | 170° C. | 170° C. | 170° C. | 170° C. | 170° C. |

The molten polymer arrived in the screw head (Z10) comprising a die plate with one hole of 3.5 mm and was immediately immersed in a 2 m long cold water bath, filled with a mix of water and crushed ice. Resulting bath temperature was about 5° C.

The resulting extrudate was granulated to fine solid pellets <3 mm and designated sample BC2. The degree of crystallinity of amorphized sample BC2 was 2%.

In a second embodiment, the amorphizing step as disclosed above (with same extruder parameters and cooling conditions) was performed on BC1, with the addition of 10% of water by total weight to Bioware cups flakes. The mixture was then mixed before introducing in the principal hopper (before Z1).

The resulting extrudate was granulated to fine solid pellets <3 mm, and a sample BC3 was collected.

The degree of crystallinity of BC3, measured by DSC, was 7%.

B) Enzymatic Depolymerization of Amorphized PLA BioWare Cups

BC1, BC2 and BC3 were immersed in liquid nitrogen and were micronized using an Ultra Centrifugal Mill ZM 200 system to a fine powder <500 µm size, then 100 mg of each micronized sample were weighted and introduced in a dialysis tubing. 3 mL of Savinase® 16 L diluted to ¹/₁₀₀ in 0.1 M Tris buffer pH 9.5 was added in the dialysis tubing before closing it. The dialysis tubing was then introduced in a plastic bottle containing 50 mL of 0.1 M Tris buffer pH 9.5. The depolymerization was started by incubating each sample at 45° C. and 150 rpm in a Infors HT Multitron Pro incubation shaker. Aliquots of 1 mL of buffer were sampled regularly and filtered on 0.22 µm syringe filter, samples were analyzed by High Pressure Liquid Chromatography (HPLC) with an Aminex HPX-87H column to monitor the liberation of lactic acid (LA) and lactic acid dimer (DP2). Chromatography system used was an Ultimate 3000 UHPLC system (Thermo Fisher Scientific, Inc. Waltham, Mass., USA) including a pump module, an autosampler, a column oven thermostated at 50° C., and an UV detector at 220 nm. Eluent was 5 mM $H_2SO_4$. Injection was 20 µL of sample. LA were measured according to standard curves prepared from commercial LA. DP2 were measured in equivalent LA, by applying 0.8 factor to the standard curve of LA.

Hydrolysis of BioWare cups samples BC1, BC2 and BC3 were calculated based on LA and dimer of LA released. Results of depolymerization are shown in Table 3 below.

TABLE 3

Depolymerization rate of PLA BioWare cups before (BC1) and after amorphization according to the invention (BC2 and BC3) after 7 h of reaction

| Samples | Degree of crystallinity | Degradation rate after 7 hours | Degradation rate in base 100 compared to BC1 |
| --- | --- | --- | --- |
| BC1 | 24% | 34% | 100 |
| BC2 | 2% | 44% | 129 |
| BC3 | 7% | 41% | 121 |

After seven hours, 44% and 41% of amorphized samples BC2 and BC3, respectively, were degraded by the enzyme, whereas only 34% of BC1 was enzymatically degraded.

The invention claimed is:

1. A process for degrading a plastic product comprising at least one semi-crystalline thermoplastic polyester comprising the steps of:
  a) amorphizing at least partially said at least one semi-crystalline thermoplastic polyester of the plastic product by heating the plastic product at a temperature above the melting temperature (Tm) of said semi-crystalline thermoplastic polyester, and further cooling the plastic product at a temperature below the crystallization temperature (Tc) of said semi-crystalline thermoplastic polyester, and
  b) depolymerizing said at least partially amorphized polyester of the plastic product by contacting the plastic product with a depolymerase able to depolymerize said at least partially amorphized polyester into monomers and/or oligomers.

2. The process of claim 1, wherein the cooling of said plastic product comprises cooling the plastic product to a temperature below the glass transition temperature (Tg) of said semi-crystalline thermoplastic polyester of the plastic product.

3. The process of claim 1, wherein the step of amorphizing further comprises adding at least one degrading agent.

4. The process of claim 3, wherein the degrading agent is selected from the group consisting of water, monomers of a polyester of the plastic product, metal alkoxides, alcohol and plasticizers.

5. The process of claim 1, wherein the step of amorphizing is performed by use of an extruder.

6. The process of claim 1, wherein the step of amorphizing leads to at least partially amorphized polyester with at most 30% of crystallinity.

7. The process of claim 1, wherein the depolymerising step comprises contacting the plastic product with at least one microorganism expressing and excreting a depolymerase able to depolymerize said at least partially amorphized polyester into monomers and/or oligomers.

8. The process of claim 1, further comprising recovering oligomers and/or monomers resulting from depolymerisation of said at least partially amorphized polyester of the plastic product.

9. The process of claim 8, wherein the recovered oligomers and/or monomers are further purified.

10. The process of claim 1, further comprising a preliminary depolymerising step performed prior to the amorphizing step.

11. The process of claim 1, comprising a pretreatment step to modify the plastic product mechanically and/or physically and/or chemically and/or biologically.

12. The process of claim 11, wherein said pretreatment step is performed before the amorphizing step and/or before the depolymerising step.

13. The process of claim 1, wherein the plastic product comprises semi-crystalline polyesters, selected from polyethylene terephthalate (PET), polytrimethylene terephthalate (PTT), polybutylen terephthalate (PBT), polyethylene isosorbide terephthalate (PEIT), polylactic acid (PLA), polyhydroxy alkanoate (PHA), polybutylene succinate (PBS), polybutylene succinate adipate (PBSA), polybutylene adipate terephthalate (PBAT), polyethylene furanoate (PEF), polycaprolactone (PCL), poly(ethylene adipate) (PEA), polybutylene succinate terephthalate (PBST), polyethylene succinate (PES), poly(butylene succinate/terephthalate/isophthalate)-co-(lactate) (PBSTIL) and blends/mixtures of these materials.

14. The process of claim 1, wherein the plastic product comprises semi-crystalline polyethylene terephthalate and/or semi-crystalline polylactic acid.

15. The process of claim 13, wherein the depolymerizing step is performed by contacting the plastic product with a depolymerase selected from the group consisting of cutinases, proteases, lipases, carboxylesterases and esterases.

16. The process of claim 1, wherein the plastic product comprises at least PET, and the amorphizing step comprises heating the plastic product to a temperature above 245° C., then cooling the plastic product to a temperature between 5° C. and 65° C.

17. The process of claim 1, wherein the plastic product comprises at least PET, and the depolymerizing step comprises submitting the plastic product to a cutinase.

18. The process of claim 1, wherein the plastic product comprises at least PET, and the amorphizing step comprises exposing the plastic product to a temperature above 245° C., then exposing the plastic product to a temperature comprised between 5° C. and 65° C., and the depolymerising step comprises contacting the plastic product to a cutinase.

19. A method of producing monomers and/or oligomers from a plastic product containing at least one semi-crystalline thermoplastic polyester, comprising submitting the plastic product to an amorphization step to amorphize at least partially said semi-crystalline thermoplastic polyester of the plastic product, wherein the amorphization step comprises heating the plastic product to a temperature above the melting temperature (Tm) of said semi-crystalline thermoplastic polyester and further cooling the product to a temperature below the crystallization temperature (Tc) of said semi-crystalline thermoplastic polyester, and to a depolymerising step to depolymerise said at least partially amorphized polyester of the plastic product, wherein the depolymerizing step comprises contacting the plastic product with a depolymerase able to degrade said at least partially amorphized polyester.

20. The method of claim 19, wherein the plastic product comprises polyethylene terephthalate, the depolymerizing step comprising exposing the plastic product to a cutinase.

21. A process for degrading a plastic product comprising at least one semi-crystalline thermoplastic polyester that has been previously amorphized by heating the plastic product to a temperature above the melting temperature (Tm) of said semi-crystalline thermoplastic polyester and further cooling the plastic product to a temperature below the crystallization temperature (Tc) of said semi-crystalline thermoplastic polyester comprising contacting said amorphized plastic product with a depolymerase able to degrade said previously amorphized polyester.

* * * * *

UNITED STATES PATENT AND TRADEMARK OFFICE
CERTIFICATE OF CORRECTION

| | |
|---|---|
| PATENT NO. | : 10,767,026 B2 |
| APPLICATION NO. | : 16/302107 |
| DATED | : September 8, 2020 |
| INVENTOR(S) | : Marie-Laure Desrousseaux et al. |

It is certified that error appears in the above-identified patent and that said Letters Patent is hereby corrected as shown below:

In the Specification

Column 21,
Line 53, "<5001 μm" should read --<500μm--.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*